(12) United States Patent
Chatzipanagiotis et al.

(10) Patent No.: US 10,599,449 B1
(45) Date of Patent: Mar. 24, 2020

(54) PREDICTIVE ACTION MODELING TO STREAMLINE USER INTERFACE

(71) Applicant: Amazon Technologies, Inc., Seattle, WA (US)

(72) Inventors: Nikolaos Chatzipanagiotis, Seattle, WA (US); Pragyana K. Mishra, Seattle, WA (US); Roopesh Ranjan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 15/389,102

(22) Filed: Dec. 22, 2016

(51) Int. Cl.
| | | |
|---|---|---|
| *G06F 9/451* | (2018.01) | |
| *G06F 17/22* | (2006.01) | |
| *G06N 5/02* | (2006.01) | |
| *G06N 3/04* | (2006.01) | |
| *G06Q 30/06* | (2012.01) | |

(52) U.S. Cl.
CPC .......... *G06F 9/451* (2018.02); *G06F 17/2288* (2013.01); *G06N 3/04* (2013.01); *G06N 5/022* (2013.01); *G06Q 30/0633* (2013.01)

(58) Field of Classification Search
CPC ...................................................... G06F 9/451
USPC ....................................................... 715/745
See application file for complete search history.

(56) References Cited

U.S. PATENT DOCUMENTS

| | | | |
|---|---|---|---|
| 9,965,129 B2* | 5/2018 | Reiley ..................... | G06F 3/048 |
| 10,002,322 B1* | 6/2018 | Ravindran ........... | G06N 3/0445 |
| 2007/0136112 A1* | 6/2007 | Sussman ................ | G06Q 10/02 |
| | | | 705/5 |
| 2009/0234711 A1* | 9/2009 | Ramer ................ | G06Q 30/0267 |
| | | | 705/14.66 |
| 2015/0371144 A1* | 12/2015 | Engle ...................... | G06F 17/18 |
| | | | 706/58 |
| 2016/0189210 A1* | 6/2016 | Lacey ................ | G06Q 30/0261 |
| | | | 705/7.31 |
| 2017/0249557 A1* | 8/2017 | Tendick .................. | G06N 5/043 |
| 2018/0036591 A1* | 2/2018 | King ..................... | H04L 67/306 |
| 2018/0046920 A1* | 2/2018 | Yang ..................... | G06N 3/0445 |
| 2018/0157747 A1* | 6/2018 | Tiwary ..................... | G06N 3/08 |
| 2018/0158078 A1* | 6/2018 | Hsieh ..................... | G06N 20/00 |
| 2018/0174060 A1* | 6/2018 | Velez-Rojas ............. | G06N 5/02 |

\* cited by examiner

*Primary Examiner* — William D Titcomb
(74) *Attorney, Agent, or Firm* — Lee & Hayes, P.C.

(57) ABSTRACT

A prediction model may be created to predict future actions likely to be performed by users while interacting with electronic content via user devices. The predictions may be used to streamline access to interface controls or other information to enable the users to facilitate or expedite performance of the predicted actions, while reducing computational demands on computing devices that provide the electronic content by, for example, reducing unnecessary intervening computing actions.

20 Claims, 9 Drawing Sheets

PREDICTIVE ACTION MODELING TO STREAMLINE USER INTERFACE

BACKGROUND

People access electronic content for many different reasons, such as to find information or perform research, for entertainment, to make purchases, to manage accounts, and/or to communicate with other people. When people access the internet, they often leave a trail of data evidence that can be used to reconstruct their path through different sites, different pages, and so forth. This information is sometimes used by companies that track "transits", where users navigate from one site hosted by a first entity to a second site hosted by a second, different entity. These actions reveal a relationship between the first and second entity. One common use of this information is to provide a referral credit to a site that directs or otherwise causes a user to visit the second site.

Although electronic content can be dynamically tailored for users, general user interfaces often include a same document object model (DOM) tree and include same controls regardless of a visitor to the user interfaces. Instead, the underlying content is typically modified or personalized for the recipient while reusing a same DOM tree of a user interface.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
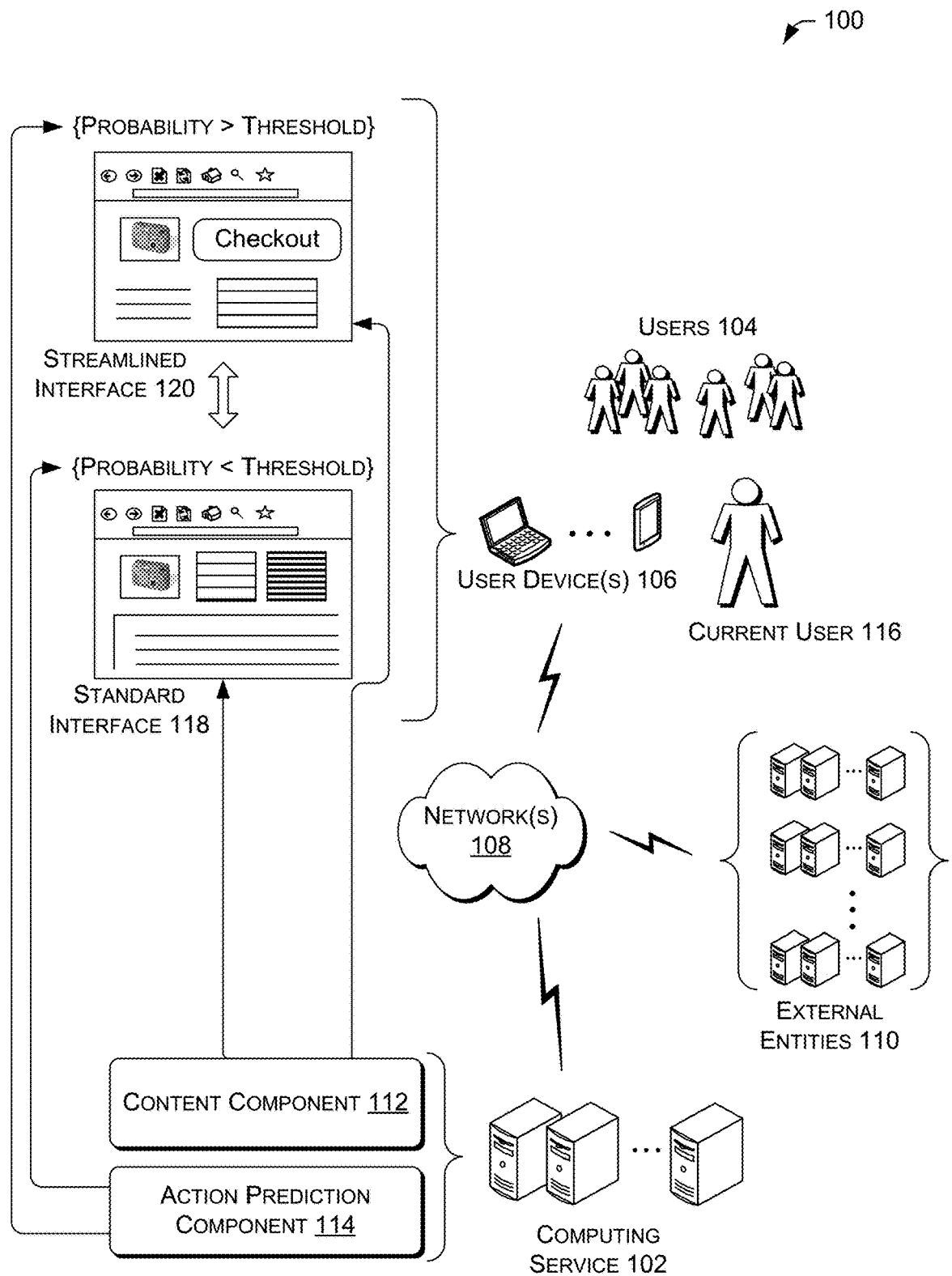
FIG. 1 is a schematic diagram of an illustrative environment to perform predictive action modeling and utilize the predictive results to modify an interface.

This disclosure is directed to predicting future sequential actions likely to be performed by users while interacting with electronic content via user devices, and then streamlining access to controls or other information to enable the users to perform the predicted actions, while reducing computational demands on computing devices that provide the electronic content by, for example, reducing unnecessary intervening computing actions.

Typically, there is an instant during browsing on an electronic marketplace, or interacting with other electronic content, when a user decides and is absolutely certain to obtain a product or take some other action. Through detailed analysis of many user's activities and trends, such a "tipping point" (e.g., event or action) may be discovered even when it is not clearly known by the user. By knowing an event or action that predicts a future action with a fair certainty (e.g., high correlation), this information may be leveraged to benefit both a user and the content provider. In particular, content providers may take actions on behalf of a user to reduce a need to provide additional data to the user, thereby reducing demand on computing devices and freeing those devices to perform tasks for other users or for other tasks.

In accordance with various embodiments, a computing service may deploy a computing device (or collection thereof) to collect data pertaining to sequential user interaction with different electronic content, such as transits between different sites or pages, interaction with items, use of interface controls, and/or other actions. This interaction may include a high value action, which may be a desirable outcome for a content provider. For example, a high value action may include a user subscribing to some content or service, making a purchase or engaging in another transaction, or interacting with an interface control (e.g., an input field, a selectable button, etc.). In some embodiments, the interaction may be a specific intermediate action that is sequentially before the high value action, and may directly lead to performance of the high value action.

The computing service may generate a prediction model, using at least some of the collected sequential information associated with high value actions, to associate probabilities with events and/or actions of users associated with electronic content, where the probabilities predict a likelihood of performance of the high value action (or multiple different high value actions). For example, users that take a certain action, in view of a prior sequence of events/action, may have a forty percent likelihood of performing a specific high value action (e.g., entering personal data, purchasing an item, etc.) while users that take a second and third action after the first action, in view of a prior sequence of events/ action, may have a ninety percent likelihood of performing the specific high value action. The prediction model may include or consider sequential relationships of actions/ events and possibly temporal data associated with the action/ events. In some embodiments, the prediction model may be generated using classic feedforward neural networks or recurrent neural networks, among other modeling techniques.

The computing service may deploy the prediction model to determine probabilities of future actions while a user interacts with electronic content. Using the example above, if a current user takes the first action, the prediction model may associate the forty percent likelihood to the current user for performing the high value action, and so forth. The probability information may be compared to threshold information, which when reached or exceeded, may be used to influence interfaces and/or data flow to the current user. For example, when the current user is deemed likely to take a specific high value action, the computing service may streamline or otherwise simplify an electronic process for the current user to achieve the high value action, possibly by facilitating performance of the high value action and/or performance of a specific intermediate action, which may directly lead to performance of the high value action. The streamline may be implemented by causing some actions to be automated or performed without input received from the current user, by providing additional controls or different placement of controls on interfaces provided to the current user, or by streamlining interfaces in other ways (e.g., by removing less relevant content, etc.). By streamlining the interfaces, a content provider may reduce an amount of content that needs to be served to the user, via the user's device, and thus free up computing resources to perform other tasks, possibly for other users.

The techniques and systems described herein may be implemented in a number of ways. Example implementations are provided below with reference to the following figures.

FIG. 1 is a schematic diagram of an illustrative environment 100 to perform predictive action modeling and utilize the predictive results to modify an interface. The environment 100 may include a computing service 102 that may exchange data with users 104, such as by providing electronic content to user devices 106, as well as monitoring user interaction with the electronic content, via one or more networks 108. The network(s) 108 may include wired and/or wired networks. In some embodiments, the computing service 102 may host an electronic marketplace or other electronic repository that provides information to users and collects other information from the users.

In some embodiments, the electronic content, or a portion thereof, may be provided by one or more different entities 110 or services, such as another entity, via the network(s) 108. For example, the computing service may determine that a user's interaction with some electronic content resulted from a transit from a different site provided by one of the different entities 110 that is also a content provider. One of the users 104 may have landed on a site having content provided by the computing service 102, such as in response to a user selecting a link from another site (e.g., an external site). User interaction with content provided by the computing service 102 may be monitored or otherwise stored for use in developing a prediction model, as discussed below. Ultimately, the computing service 102 may or may not provide all content consumed by the users 104 that is used to create a prediction model to predict future actions of the users or other users. However, the computing service 102 monitors (or receives) at least some of the user activities to create the prediction model, as described in greater detail below.

In various embodiments, the computing service 102 may include a content component 112 and an action prediction component 114. The content component 112 may provide perform various functions including receiving data pertaining to actions and/or events associated with specific users of the users 104. For example, the content component 112 may receive indications of user actions performed with content providers (possibly including the computing service 102), such as web pages viewed, controls activated or selected, transits from different sites, time between action, and other user interaction data. In addition, the content component may identify or receive designation of high value actions which may include a desired outcome of an entity, such as a desired outcome of the computing service 102 and/or of one of the entities 110. Examples of high value actions may include a purchase of an item, completion of a transaction, a subscription, receipt of personal information and/or contact information, creation of an account, activation of a control (e.g., selection of a link to another entities' content, etc.).

The action prediction component 114 may perform analysis, such as using neural networks and/or other modeling techniques, to create a prediction model that provides predictions as to whether a current user 116 is likely to perform a high value action, and possibly a time frame of the performance of the high value action. The action prediction component 114 may create and maintain the prediction model and/or implement the prediction model to provide predictions of future user actions which may be leveraged to reduce load on computing devices and facilitate or expedite performance of the high value actions, for example. In some embodiments, the action prediction component 114 may include multiple high value actions, and may predict user occurrence for some or all of them as the current user 116 interacts with electronic content.

In some embodiments, the action prediction component 114 may generate a model using recurrent neural networks, which enables generating probabilities of a likelihood of occurrence of a future action after occurrence of another event or action. For example, during a session, a first event (e.g., user selecting a product review tab, etc.) may include a 68% probability that the user will purchase an item subject to the review at a later point in time, possibly within a predicted threshold amount of time. The user may then perform another action (e.g., adding the item to the user's cart, etc.) to cause occurrence of a second event during the session. The second event may include a 91% probability that the user will purchase the item subject to the review at a later point in time, possibly within a predicted threshold amount of time. The action prediction component 114 may include threshold values for individual high value actions. When the respective probabilities reach or exceed the threshold values, the computing service 102 may provide a streamlined or special user interface, which may include a different document object model (DOM) tree and/or other differences from standard user interfaces, to facilitate or expedite performance of the high value action and reduce computational load of computing devices, such as by retraining from providing intervening pages or data that may not be helpful to the user, etc.

As shown in FIG. 1, when the action prediction component 114 determines that a probability is less than (<) a threshold, the action prediction component 114 may cause the content component 112 to deliver a first, standard interface 118 to the current user 116 via a user device, possibly as a result of a requested action by the current user 116 (e.g., selection of a control, navigation, or other user interaction). The standard interface 118 may be commonly provided to users that are not associated with a high confidence to perform a specific high value action, such as a general population of users. However, when the action prediction component 114 determines that a probability is greater than (>) the threshold, the action prediction component 114 may cause the content component 114 to deliver a second, streamlined interface 120 to the current user 116 via the user device, possibly as a result of a requested action by the user (e.g., selection of a control, navigation, or other user interaction). The streamlined interface 120 may be provided to select users that are associated with a high confidence to perform the specific high value action, such as purchase an item, provide contact information, select a control, and/or perform another high value action.

In various embodiments, the streamlined interface 120 may include additional controls (e.g., links, buttons, navigation controls, data entry fields, and/or other user interaction devices in the electronic content) to enable facilitated or expedited performance of the high value action associated with the user. For example, the streamlined interface 120 may include additional controls, a larger control, and/or a more prominently placed control to enable facilitated or expedited performance of the high value action as compared to the standard interface 118. In some embodiments, the streamlined interface 120 may include fewer controls or content that is unrelated to performance of the high value action as compared to the standard interface 118. For example, the streamlined interface 120 may be more narrowly tailored to achievement of the high value action to enable the current user 116 to more quickly perform the high value action, and thus reduce additional data sent to the user, via a user device, from the computing service 102 or another entity.

Additional details about the content component 112 and the action prediction component 114 are provided below with reference to FIG. 2.

Figure 2:
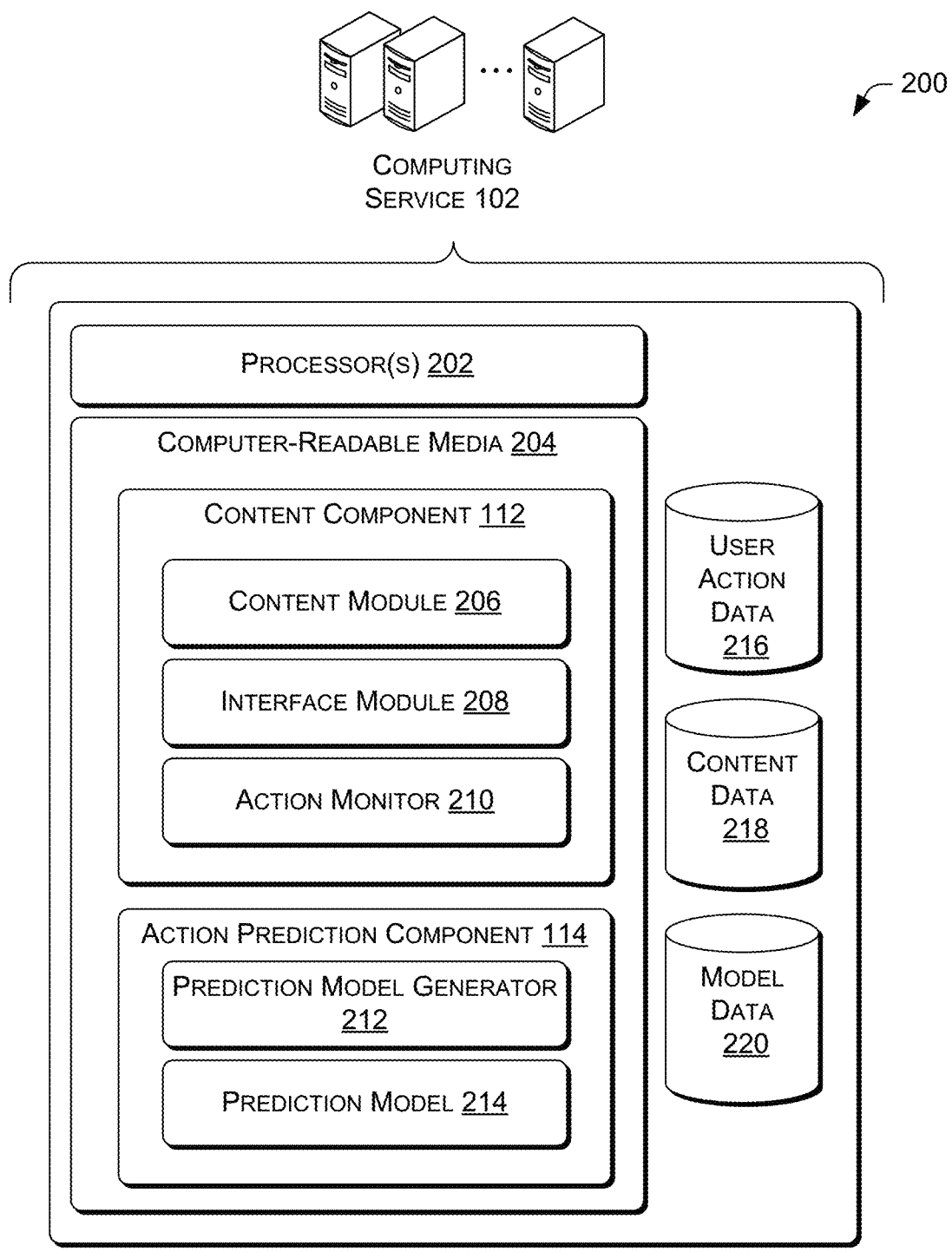
FIG. 2 is a schematic diagram of an illustrative computing architecture of the computing service shown in FIG. 1.

FIG. 2 is a schematic diagram of an illustrative computing architecture 200 of the computing service shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the computing service 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/ machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store the content component 112 and the action prediction component 114, which each may include additional components, modules, generators, monitors, and/or models. The content component 112 may include a content module 206, an interface module 208, and/or an action monitor 210, each described below. The action prediction component 114 may include a prediction model generator 212 and/or a prediction model 214, each described below. In various embodiments, the computing architecture 200 may include user action data 216, content data 218, and/or model data 220, or may include access to the same. The components and/or subcomponents may be stored together or in a distributed arrangement.

The content module 206 may provide content to user devices in response to request for data from the user devices. For example, in the context of an electronic marketplace, the content module 206 may provide portions of the content data 218 (e.g., item data, price information, images, etc.) to a requesting user device in response to requests received from the user device.

The interface module 208 may provide an interface for providing or displaying (via a layout) the content provided by the content module 206. For example, the interface module 208 may include DOM trees that provide instructions on how to provide the content from the content module 206 to the user device for display by the user device. In some embodiments, the interface module 208 may provide streamlined interfaces to certain users, as discussed herein, when those users have a probability greater than a threshold value, where the probability relates to likelihood of a user performing a high value action. The high value actions may be designated by the computing service 102, and may be used to inform creation of the streamlined interfaces, among other possible uses.

The action monitor 210 may receive data that indicates events and/or actions related to access or interaction with the content from the content module 206 and/or the interfaces provided by the interface module 208. The action monitor 210 may access data sent to user devices, as well as metadata and/or other data passed to the computing services along with requests for content, such as transit information (e.g., a previous site visited by a user that may or may not have directed the user device to the current site, etc.), among other possible information, including a user identifier. The user identifier may be enable an association with user action data 216, which may be populated by the action monitor 210 based on the various received data associated with specific users. In some embodiments, the users may be anonymous, but include an identifier for a session to enable tracking user actions during the session. Thus, the action monitor 210 may not know an identify of a user, but may know different actions and events associated with the user during a session. The user action data 216 may inform the action prediction component 114 when building or updating the prediction model 214 via the prediction model generator 212. The action monitor 210 may also track current user actions to inform a determination of a prediction of a likelihood of performance of a high value action using the prediction model 214.

The prediction model generator 212 may leverage the user action data 216, which may be associated with high value actions to create the prediction model 214 and/or to modify, update, or maintain the prediction model 214 over time. The prediction model generator 212 may deploy a neural network, such as a feedforward neural network or a recurrent neural network, to create probabilities associated with different events included in interaction with users via user devices. The probabilities may indicate a likelihood of a future performance of a high value action. When a probability reaches or exceeds a threshold value for a specific high value action, the interface module 208 may be informed and may then provide a streamlined or special interface to the user to facilitate or expedite performance of the high value action while reducing possible workload of computing devices by refraining from providing some data that distracts from achievement of the high value action, for example. The prediction model generator 212 may generate and/or maintain, update, or modify the model data 220, which may store events (e.g., content, pages, control access, interfaces, etc.) and their association with probabilities for specific high value actions, among other possible data. An example of the model data is shown and described in FIG. 3, below.

The prediction model 214 may implement the model data 220 to inform use of streamlined interfaces and/or other actions. The prediction model 214 may include thresholds for individual probabilities for specific high value actions. Thus, different high value actions may have different thresholds which prompt use of streamlined interfaces or other special actions. The thresholds may be stored in the model data 220. Thus, the prediction model 214 may receive user events from the action monitor 210 for a current user, may apply the prediction model, and may provide probabilities of a future occurrence of specific high value action(s) based on that event and/or subsequent events for the user, stored in the user action data 216.

Additional explanation of the content component 112 and/or the action prediction component 114 may be found below with reference to FIGS. 3-8.

Figure 3:
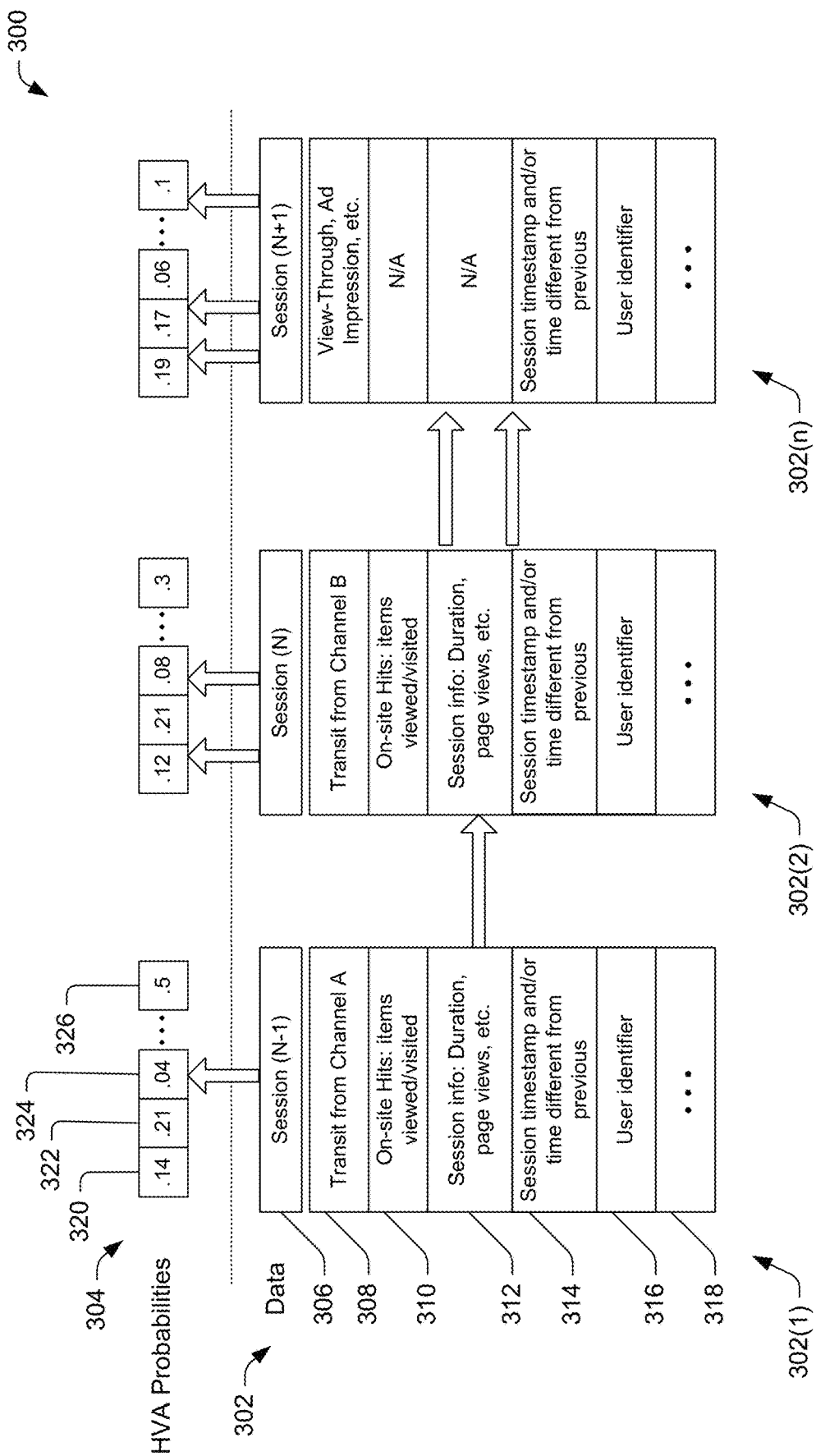
FIG. 3 is a schematic diagram of an illustrative data structure used to model predictive actions for users that interact with electronic content.

FIG. 3 is a schematic diagram of an illustrative data structure 300 used to model predictive actions of users that interact with electronic content. The data structure 300 represents multiple sessions with a user, such as the current user 116 shown in FIG. 1. As shown in FIG. 3, three sessions 302, namely 302(1)-302(n), are depicted (also referred to as events and/or actions), each having different attributes, such as time of occurrence, user inputs, and so forth. The data 302 may be data captured by the data monitor 210. This data may be used to calculate probabilities 304 for different high value actions (HVAs).

Illustrative fields of the data 302 are described next, which may be single value fields, arrays, and/or may store other types or quantity of data. More or fewer fields may be used by the action monitor 210 when creating the user action data 216 or other data.

In various embodiments, the data 302 may include a first field 306 that indicates a sequential order of the event in the session. The order may be a number or other value or character that can be ordered with respect to other values or characters.

A second field 308 may include a channel or transit information, such as a prior electronic location visited by the user device, such as a different site, a link that cause the user to "land" at the current site, and so forth. For example, a user may visit a first site and then type in a new URL, select a browser bookmark, or otherwise cause navigation to a second site. In some instances, the user may click on a link, a control, an ad, or another feature that redirects the user to a different site or location. The second field 308 may store this type of information.

A third field 310 may include a platform, such as data pertaining to interaction at a site, such as on-site hits, items viewed/visited, controls accesses, and so forth. The third field 310 may track user interaction, at least at a high level, at a site or a portion of a site.

A fourth field 312 may include duration, and may include session information, time information, page views, and other session level information associated with the event.

A fifth field 314 may include a time difference, which may be a timestamp and/or time difference from a prior action. A time stamp may be upon delivery of the page, upon exit of the page, both, or other timestamps may be used to track time on page or site.

A sixth field 316 may include a user identifier to track events with the user. The events of the session may be analyzed at a user level to determine trends of individual users rather than at a macro level, which may be less revealing about sequential and spatial relationships of user interaction.

Additional fields 318 may be used to record a number of page views, a number of glance views, a landing page product category, a purchase indicator (for previous history), a purchased product category (for previous transit), customer engagement metrics, and/or other data relevant to the prediction modeling.

The HVA probabilities represent values that may be target values and/or may indicate a likelihood of a user taking a predetermined future high value action. As shown in FIG. 3, four different probabilities 320, 322, 324, and 326 are shown for each session, each associated with a different high value action, however, more or fewer probabilities may be stored/generated and used depending on the number of high value actions determined and/or other related considerations. The prediction model may update the probabilities during occurrence of a session, based on a session, and/or after a session. The data in the session, as well as data in other sessions (302(2)-302(n), etc., may allow the model to learn and predict which features and subsequences are important in a user journey to a high value action (e.g., a conversion, etc.), which in turn enables the computing service 102 to identify tipping points that predict occurrence of the high value action. The probability may then be compared to a threshold value, which when reached or exceeded, may trigger use of a streamlined interface or other special data interactions with a user.

Each event/action can potentially affect some or all downstream events/actions, as depicted by the arrows shown between the sessions in FIG. 3. Further, the amount of the effect is learnable by a model, such as by an RNN. In terms of target values, RNNs allow the computing system 102 to have 'per step' predictions (e.g., per step probabilities of conversion for specific product categories, etc.). Another possible formulation includes training the RNN to learn and simulate future customer behavior.

Recurrent neural networks (RNNs) are used for high value actions or "conversion" prediction. Advantages of RNNs emanate from a simple fact that the characteristics of each step (session, event, action, etc.) can potentially affect some or all downstream steps, and the amount of the effect is learnable. Other advantages include scalability, flexibility of representation, malleability of formulation, and possibly better prediction accuracy than other established processes. Different RNNs can be trained to output different predictions, as described below.

As an example, click history of a customer may be provided in the form of a sequence of sessions. Here, the term 'session' is used in an inclusive, general sense to refer to a standalone instance of a customer's history. For example, a session may be a transit to the website along with the corresponding on-site activity information, or it can be a view-through/impression effect for customers that were exposed to an ad or email but never clicked on it/them. The contents of a session depend on the availability of data. Sessions may be the unit building blocks of the inputs and target values for an RNN model.

Moreover, the target values can consist of the probability of conversion for several item subcategories. This may allow the computing system 102 to learn and predict which features and subsequences are important in a customer's journey to a conversion, which in turn enables the computing system 102 to identify the tipping points that predict a conversion with high enough probability (e.g., determined by comparison to a threshold).

Apart from conversion prediction, several other target values can be formulated to accommodate different business needs. For instance, the target values could be the properties of the next session (e.g., which channel is the customer most probable to use next to arrive to the website, etc.). Learning the probable behavior of customers allows the computing system 102 to generate downstream sequence steps for a customer. In other words, the computing system 102 can train an RNN that simulates a customer's future behavior, given the recent transit history of that customer, which can further enhance predictive abilities in a multiplicity of ways.

Besides using RNNs, other neural networks may be used, such as classic feedforward neural networks, which may not capture a temporal aspect of the data as captured by RNNs. Recurrent neural networks are not the only models capable of representing time dependencies. Markov chains can model transitions between states in an observed sequence. Hidden Markov models (HMMs) may model an observed sequence as probabilistically dependent upon a sequence of unobserved states. However, traditional Markov model approaches are limited because their states are drawn from a modestly sized discrete state space S. The dynamic programming algorithm that is used to perform efficient inference with hidden Markov models scales in time. Further, the transition table capturing the probability of moving between any two time-adjacent states is of give size. Thus, standard operations become difficult with an HMM when the set of possible hidden states grows large. Further, each hidden state can depend only on the immediately previous state. While it is possible to extend a Markov model to account for a larger context window by creating a new state space equal to the cross product of the possible states at each time in the window, this procedure grows the state space exponentially with the size of the window, rendering Markov models computationally challenging for modeling long-range dependencies.

Figure 4A:
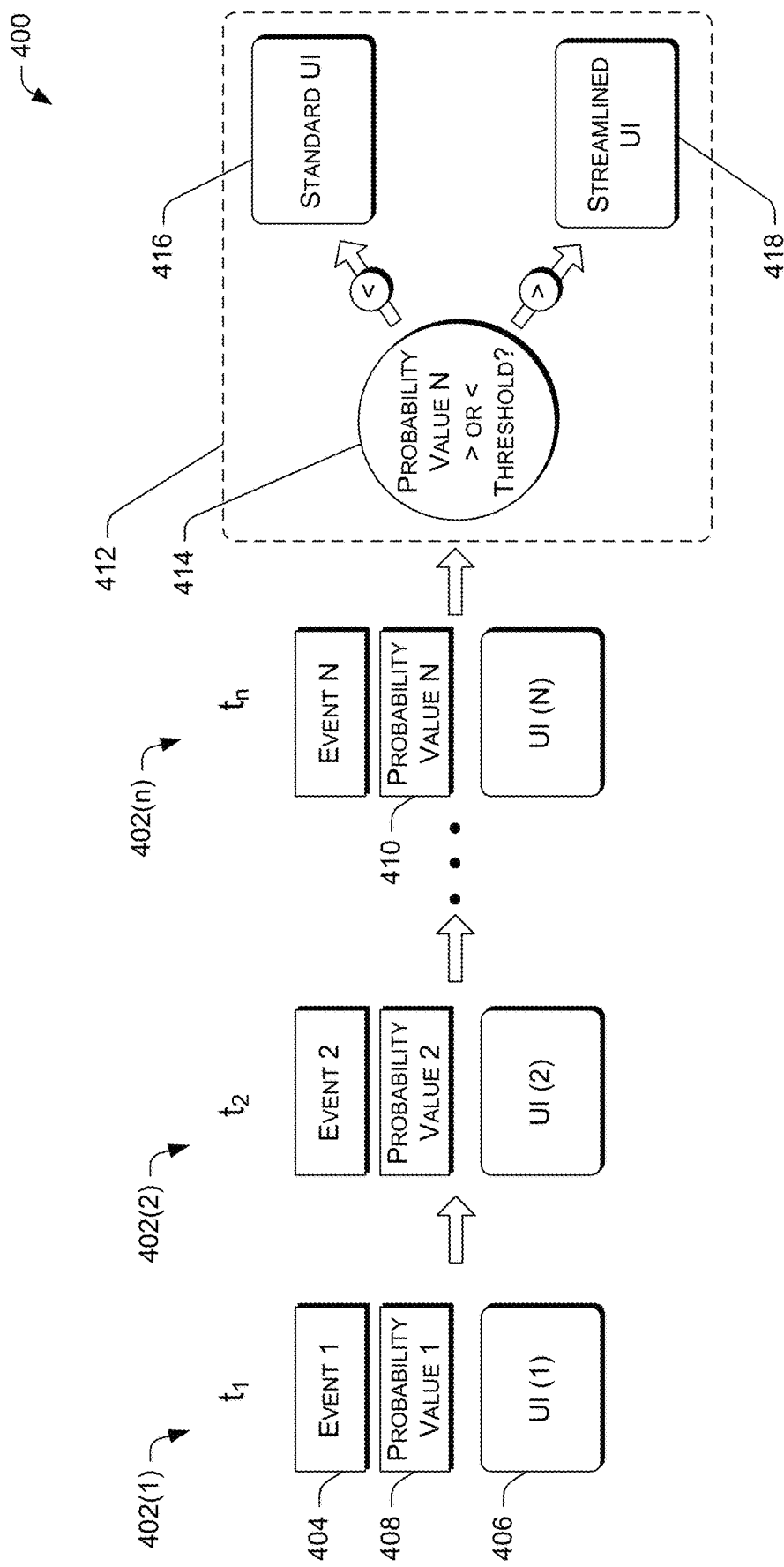
FIG. 4A is a schematic diagram of an illustrative user interface flow used to streamline interaction with users that are predicted to take certain actions.

FIG. 4A is a schematic diagram of an illustrative user interface (UI) flow 400 used to streamline interaction with users that are predicted to take certain actions. The UI flow 400 includes various data and corresponding UIs provided to a user based on interaction with a content provider. For example, at a first time $t_1$ 402(1), a first event 404 may occur, which may result in a content provider sending a first UI 406 to the user device associated with the user. The first UI 406 may organize the content requested by the user, via the user device, and may be a standard UI used to provide data to most user or to general users. A first probability value 408 may be determined by the model, such as using RNNs as discussed above. The probability value 408 may be compared to a threshold value to determine whether the user is likely to complete a specific high value action. As discussed, above, multiple predictions and probabilities may be used or determined together, where each is associated with a different high value action. Further events, UIs and probabilities may be calculated, generated, and so forth at $t_2$ 402(2) to $t_n$ 402(n).

The computing service 102 may leverage the prediction model shown by a group of possible operations 412, possibly after $t_n$ 402(n) or at other times, or possibly after or during all or many events. As shown in FIG. 4A, a probability value 410 may be compared to a threshold value via a comparison 414. When the probability is less than the threshold, then the content provider may provide the user, via the user device, a standard UI 416 in response to a request. The standard UI 416 may be a UI based on a standard DOM tree provided to general users that are not expected, with a high confidence, to perform a specific high value action. However, when the probability is greater than the threshold (or at least reaches the threshold), then the content provider may provide the user, via the user device, a streamlined UI 418 in response to a request. The streamlined UI 418 may be a UI based on a different DOM tree provided to special users that are expected, with a high confidence, to perform a specific high value action.

The streamlined UI 418 may be implemented in various ways. For example, the streamlined UI 418 may be implemented by causing some actions to be automated or performed without input from the current user. The streamlined UI 418 may be implemented by providing additional controls or different placement of controls on interfaces provided to the current user. The streamlined UI 418 may be implemented by streamlining interfaces in other ways (e.g., by removing less relevant content, etc.). By streamlining the interfaces, a content provider may reduce an amount of content that needs to be served to the user, via the user's device, and thus free up computing resources to perform other tasks, possibly for other users.

Figure 4B:
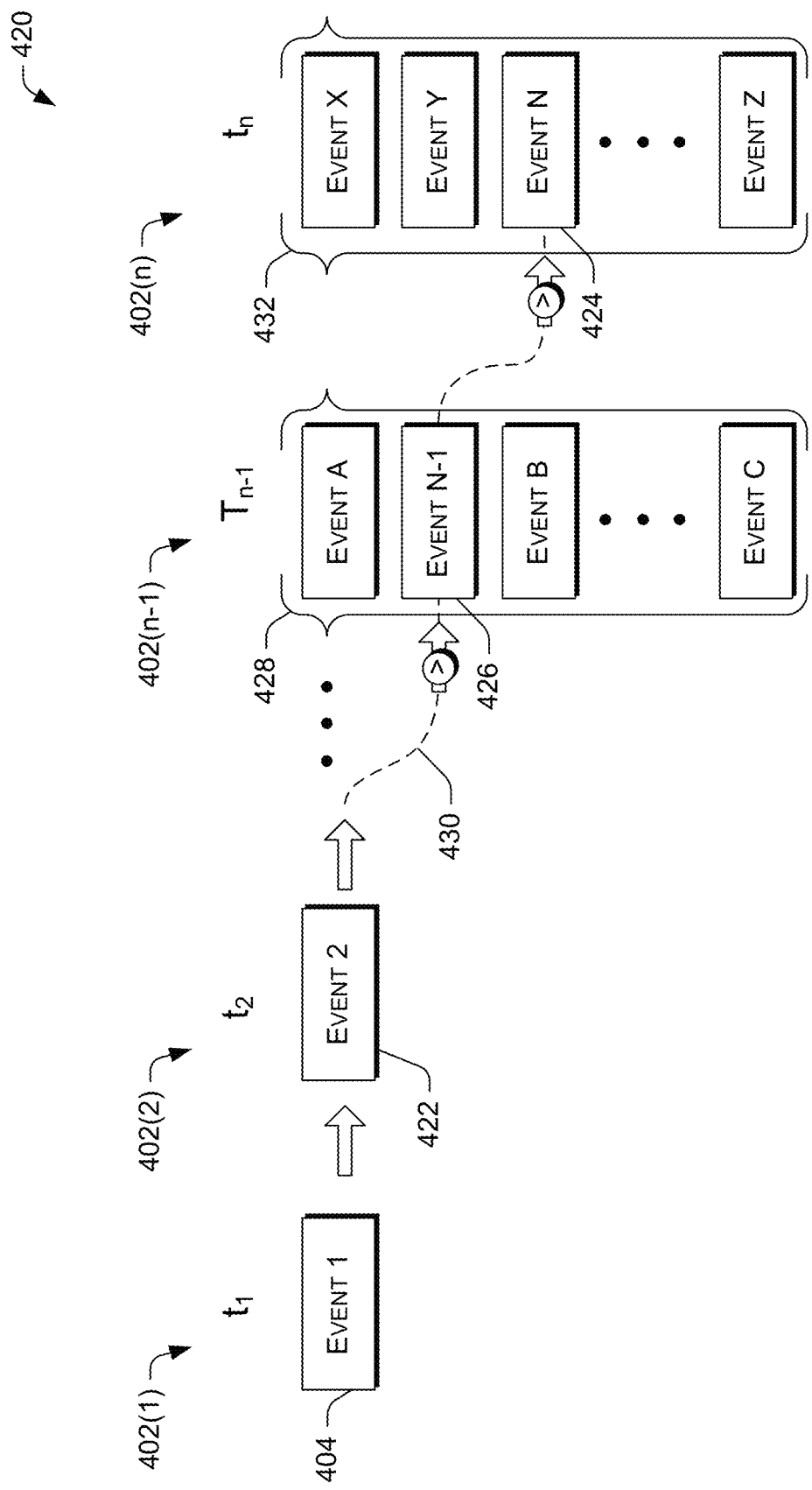
FIG. 4B is a schematic diagram of an illustrative events flow to streamline interaction with users using techniques discussed with reference to FIG. 4A.

FIG. 4B is a schematic diagram of an illustrative events flow 420 to streamline interaction with users using techniques discussed with reference to FIG. 4A. The events flow shows the first event 404, as well as a second event 422 that occurs sequentially after the first event 404, and possibly after some intervening events (depending on the user interaction). Ultimately, a high value action (or event) 424 may be a desired outcome to be facilitated by use of streamlined UIs via a computing service. To promote performance of the high value action (or event) 424, other specific intermediate events (such as a specific intermediate event 426) may be emphasized, which may help lead to performance of the high value action (or event) 424. For example, a sequential relationship may exist between the specific intermediate event 426 and the high value action (or event) 424. As the user interacts with the computing service, the user may interact with the computing service at the second event 422 and may have multiple interaction options 428 that may result from controls selected at the second event 422. Meanwhile, based on the prediction model, such as explained above in the discussion of FIG. 4A, a probability associated with user action up to this point may reach or exceed a threshold and cause the computing service to provide a streamlined UI to facilitate performance of the intermediate event 426 prior to performance of the high value action (or event) 424. Thus, the computing service may attempt to guide the user along a data path 430.

Next, or at a later time, the user may interact with the computing service at the intermediate event 426 and may have multiple interaction options 432 that may result from controls selected at the intermediate event 426. Meanwhile, based on the prediction model, such as explained above in the discussion of FIG. 4A, a probability associated with user action up to this point may reach or exceed a threshold and cause the computing service to provide a streamlined UI to facilitate performance of the high value action (or event) 424. Thus, the computing service may attempt to continue to guide the user along a data path 430 to performance of the high value action, possibly by guiding the user to or through the intermediate event 426 prior to guiding the user to the high value action (or event) 424.

FIGS. 5-8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
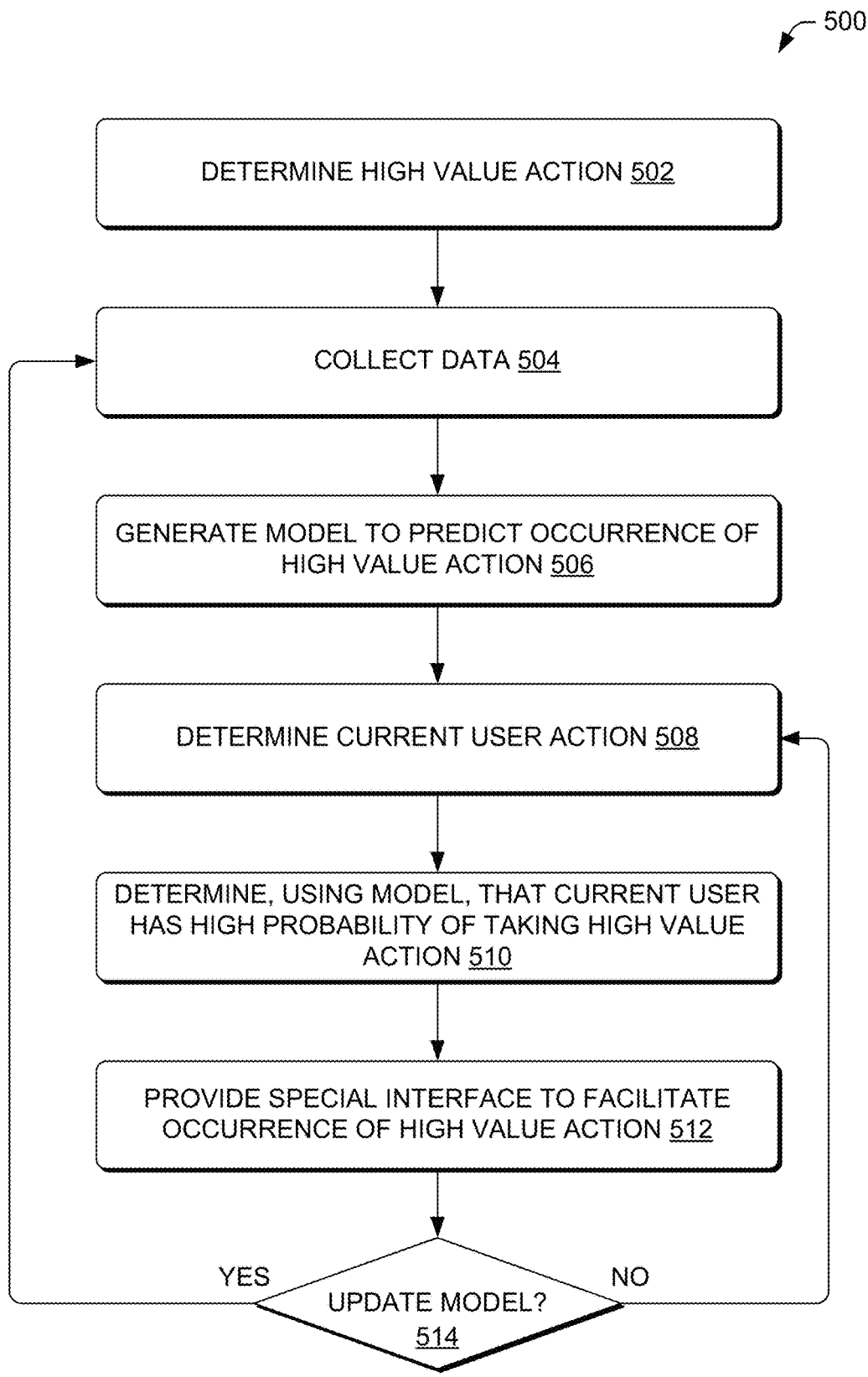
FIG. 5 is a flow diagram of an illustrative process to model predictive actions and provide a special interface in response to a predicted action.

FIG. 5 is a flow diagram of an illustrative process 500 to model predictive actions and provide a special interface in response to a predicted action. The process 500 is described with reference to the environment 100 and the computing architecture 200, and may be performed by the computing service 102.

At 502, the computing service 102 may determine one or more high value action for a content provider. The high value action may be a desirable outcome for a content provider. For example, a high value action may include a user subscribing to some content or service, making a purchase or engaging in other transaction, or interacting with an interface control. The high value action may be received by the computing service 102 as an input. The high value action may be achieved by user interaction with content data 218 provided by the content module 206 and formatted and/or presented using data provided by the interface module 208.

At 504, the action monitor 210 may collect user data to populate the user action data 216. The data may be structured using the data structure 300 shown and described with reference to FIG. 3, for example. The action monitor 210 may receive the data from a different entity, receive data from the user device, and/or monitor data provided to the user device of while interacting with the user device. The data may be used to build a model, and/or may be used with an established model, as discussed below.

At 506, the prediction model generator 212 may generate a prediction model, such as the prediction module 214, to predict occurrence of one of the high value actions determined at the operation 502. The prediction model generator 212 may use a neural network to create the model, such as a classical feedforward neural network or a recurrent neural network. Markov models, such as hidden Markov models, may be used, but may be impractical or present challenges when used with larger datasets. The prediction model generator 212 may be used to generate, update, modify, and/or maintain the prediction model 214, as discussed herein.

At 508, the action monitor 210 may determine a current user action or event. For example, the action monitor 210 may track interaction with a current user to determine probabilities for the current user by deploying the prediction model 214 from the operation 510.

At 510, the prediction model 214 may determine that the current user has a high probability of taking a high value action. For example, the prediction model 214 may determine probabilities for the high value action(s) in response to one or more events associated with the current user, including the current user action determined at the operation 508, such as by using the model data 220. The probabilities may be compared to a threshold value to determine if the current user is considered highly likely (or more than a threshold amount likely) to perform a future high value action. In some embodiments, the prediction model 214 may associate a predicted time of performance along with the probability. For example, the prediction model 214 may output a probability of 0.68 or 68% change, within 10 minutes. In various embodiments, the prediction model 214 may predict a number of expected events prior to performance of the high value action, such as 68% change after up to four more actions/events.

At 512, the interface module 208 may provide a special or streamlined interface to the user device of the current user to facilitate or expedite performance of the high value action. For example, the interface module 208 may typically provide a first, standard interface to users after the user action determined at the operation 508. However, since the user action determined at the operation 508 included a high probability that the current user will take the high value action, the interface module 208 may provide a second, streamlined interface to the current user. The streamlined interface may include a different DOM tree than the standard interface, among other possible differences. However, both interfaces may rely on similar underlying content. For example, the streamlined UI may be implemented by causing some actions to be automated or performed without input from the current user, by providing additional controls or different placement of controls on interfaces provided to the current user, or by streamlining interfaces in other ways (e.g., by removing less relevant content, etc.). By streamlining the interface, a content provider may reduce an amount of content that needs to be served to the user, via the user's device, and thus free up computing resources to perform other tasks, possibly for other users.

At 514, the prediction model generator 212 may determine whether to update the prediction model 214 based on interact with the current user and/or based on other information. The prediction model 214 may be updated randomly, after user interactions, at intervals, periodically, after batch processes, and/or at other times.

Figure 6:
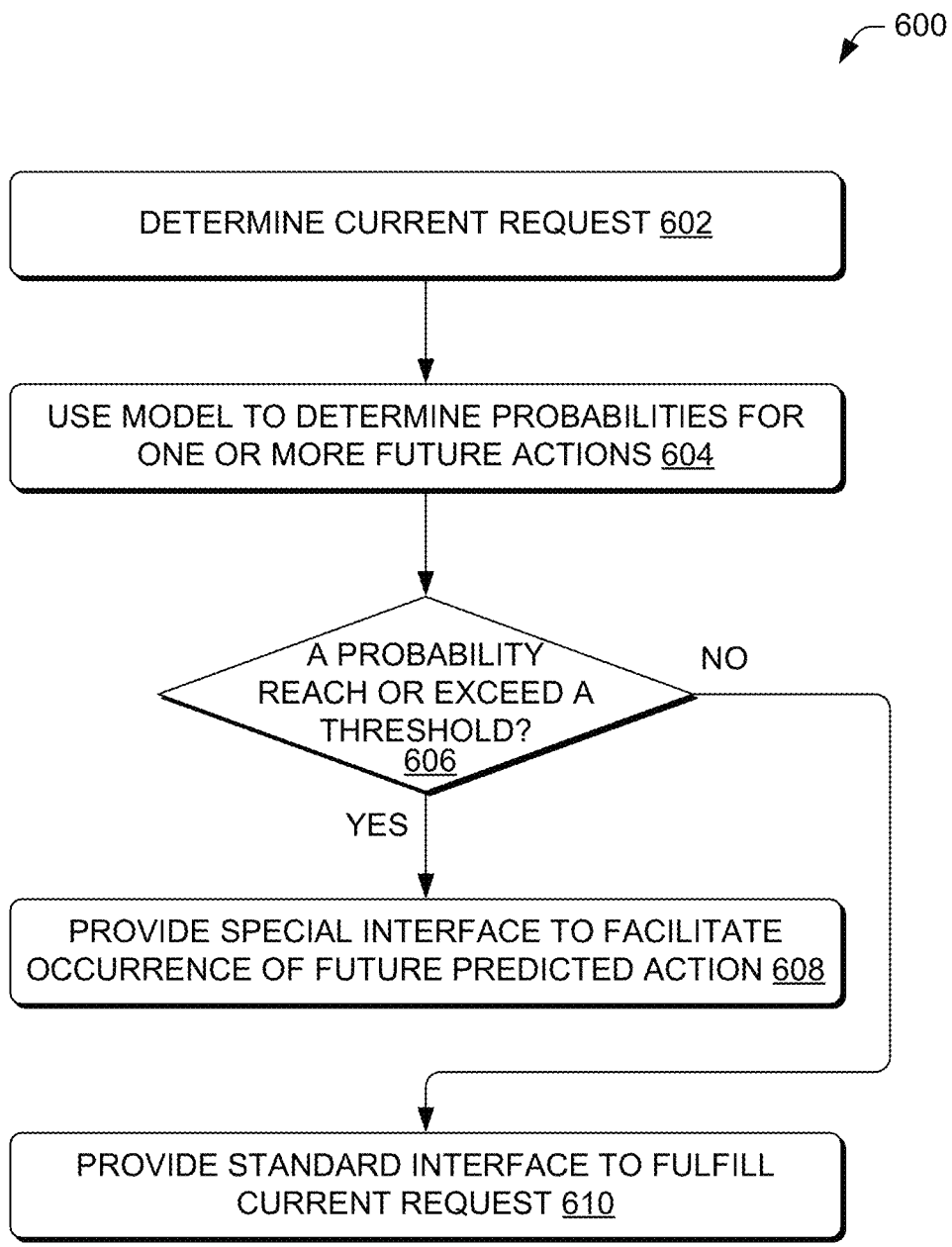
FIG. 6 is a flow diagram of an illustrative process to determine probabilities for multiple future actions, and provide a special interface in response to a probability exceeding a threshold.

FIG. 6 is a flow diagram of an illustrative process 600 to determine probabilities for multiple future actions, and provide a special interface in response to a probability exceeding a threshold. The process 600 is described with reference to the environment 100 and the computing architecture 200, and may be performed by the computing service 102.

At 602, the action monitor 210 may determine a current request from a current user, such as a request to access a page, interact with content, play media, submit data, and/or perform another interaction with content provided by the content module 206. The current request may be received by the action monitor 210 from a same entity that provides the content or a different entity.

At 604, the prediction model 214 may determine probabilities for at least two different future actions that may be performed by the current user. The prediction model 214 may leverage model data 220, which may be generated by the prediction model generator 212 during creation or maintenance of the prediction model 214. In some embodiments, the different future actions may include different threshold values, that when reached or exceeded by the probabilities (or probability values). However, the threshold value may be the same for some or all future actions that are predicted by the prediction model 214.

At 606, the prediction model 214 may determine whether one or more probabilities reach or exceed corresponding threshold values. When a probability value reaches or exceeds a threshold value associated with a particular future action (following the "yes" route from the decision operation 608), then the process 600 may advance to an operation 608. At 608, the interface module 208 may provide a special or streamlined interface to a user device to fulfill a request while providing features, controls, or other information to facilitate or expedite performance of the future action associated with the probability that reaches or exceeds the threshold. For example, the streamlined interface may include more prominent controls to perform the future action, fewer controls to perform other actions, a special window or frame to perform the future action, prepopulated data to perform the future action, and/or other difference from a standard interface provided to users when the probability is less than the threshold. In some embodiments, the probabilities of associated with multiple future action may reach or exceed corresponding threshold values. In such instances, the streamlined interface may include additional controls and/or other features to facilitate or expedite completion of one or multiple of the future actions, such as by prioritizing actions based on overall value rankings or based on other criteria.

When a probability value fails to reach the threshold value associated with the particular future action (following the "no" route from the decision operation 608), then the process 600 may advance to an operation 610. At 610, the interface module 208 may provide the standard interface to a user device to fulfill a request, which may be a same interface provided to general users. In some instances, the standard interface may include a different DOM tree and/or other differences, while including same or similar content. For example, the streamlined interface may include content that is provided in the standard interface without any addition content. However, the streamlined content may omit some content provided in the standard interface. Ultimately, the streamlined interface may be designed and implemented to facilitate or expedite completion of the future action by requiring less data and/or less computing resources to be access or requested by the current user to fulfill the future action. For example, the streamlined interface may provide links and/or controls that avoid intervening pages or redirecting the current user to pages that do not outright or directly enable completion of the future action.

Figure 7:
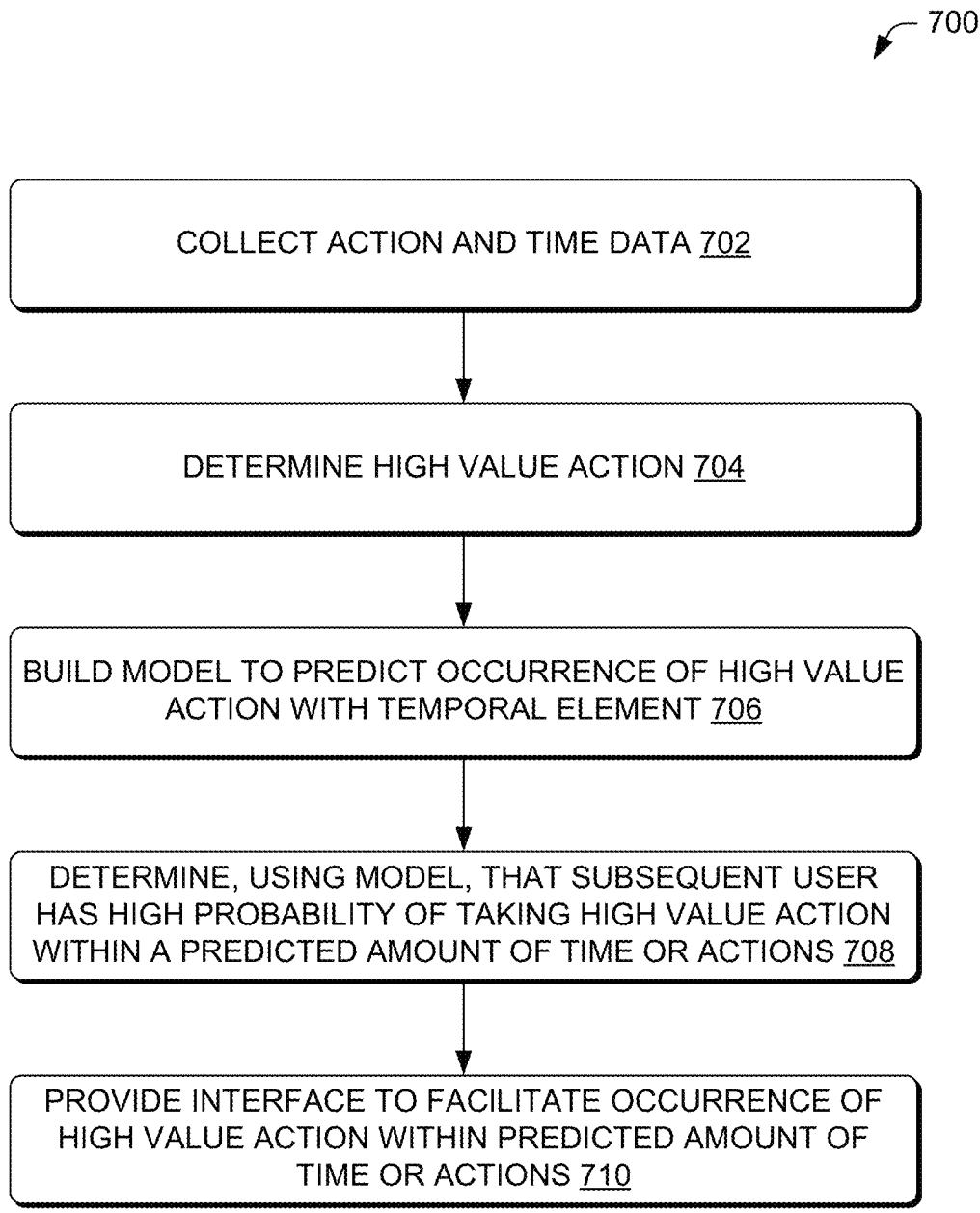
FIG. 7 is a flow diagram of an illustrative process to model predictive actions with temporal data and provide a special interface in response to a predicted action.

FIG. 7 is a flow diagram of an illustrative process 700 to model predictive actions with temporal data and provide a special interface in response to a predicted action. The process 700 is described with reference to the environment 100 and the computing architecture 200, and may be performed by the computing service 102.

At 702, the action monitor 210 may collect user data to populate the user action data 216. The data may be structured using the data structure 300 shown and described with reference to FIG. 3, for example. The data may include actions performed by users, times between actions, and/or other data pertaining to user interaction with content provided by the content module 206. The action monitor 210 may receive the data and/or time information from a different entity, receive data from the user device, and/or monitor data provided to the user device of while interacting with the user device. When the data is captured directly, the action monitor 210 may timestamp the data to provide temporal relationships in the data. The data may be used to build a model, and/or may be used with an established model.

At 704, the computing service 102 may determine one or more high value action for a content provider. The high value action may be a desirable outcome for a content provider. In some embodiments, the high value action may be received by the computing service 102 as an input. The high value action may be achieved by user interaction with content data 218 provided by the content module 206 and formatted and/or presented using data provided by the interface module 208. In some embodiments, performance of a high value action may be associated with an amount of time, such as a media or average amount of time for a user to achieve or perform the high value action when such high value action is performed. User data that does not result in performance of the high value action may be disregarded for consideration in the time data for this metric. By using the techniques described herein, the time to perform the high value action may be reduced. Use of computing resources used to allow a user, via a user device, to perform the high value action may also be reduced.

At 706, the prediction model generator 212 may generate a prediction model, such as the prediction module 214, to predict occurrence of one of the high value actions determined at the operation 704. The prediction model generator 212 may use a neural network to create the model, such as a classical feedforward neural network or a recurrent neural network. Markov models, such as hidden Markov models, may be used, but may be impractical or present challenges when used with larger datasets. The prediction model generator 212 may be used to generate, update, modify, and/or maintain the prediction model 214, as discussed herein.

At 708, the prediction model 214 may determine that a subsequent user has a high probability of taking a high value action based on interaction with the user by applying the model data 220. For example, the prediction model 214 may determine probabilities for the high value action(s) in response to one or more events associated with the subsequent user. The probabilities may be compared to a threshold value to determine if the subsequent user is considered more than a threshold amount likely to perform a future high value action. In some embodiments, the prediction model 214 may associate a predicted time of performance of the high value action along with the probability. For example, the prediction model 214 may output a probability of 0.68 or 68% to occur within 10 minutes. The predicted time may be an average time with assistance (e.g., via streamlined UIs), an average time without assistance, or similar statistical metrics (e.g., high value, mean, one standard deviation, etc.). In various embodiments, the prediction model 214 may associate a predicted number of intervening events prior to performance of the high value action along with the probability. For example, the prediction model 214 may output a probability of 0.68 or 68% to occur within 6 or fewer events. The predicted number of events may be an average number of events with assistance (e.g., via streamlined UIs), an average number of events without assistance, or similar statistical metrics (e.g., high value, mean, one standard deviation, etc.).

At 710, the interface module 208 may provide a special or streamlined interface to the user device of the subsequent user to facilitate or expedite performance of the high value action. For example, the interface module 208 may typically provide a first, standard interface to users. However, the interface module 208 may provide a second, streamlined interface to the subsequent user based on the high probability of the subsequent user taking the future high value action. The streamlined interface may include a different DOM tree than the standard interface, among other possible differences. However, both interfaces may rely on similar underlying content. For example, the streamlined UI may be implemented by causing some actions to be automated or performed without input from the current user, by providing additional controls or different placement of controls on interfaces provided to the current user, or by streamlining interfaces in other ways (e.g., by removing less relevant content, etc.). By streamlining the interface, a content provider may reduce an amount of content that needs to be served to the user, via the user's device, and thus free up computing resources to perform other tasks, possibly for other users. At 710, a predicted amount of time and/or number of events to completion of the high value action (or a specific intermediate action) may be calculated. This information may be used to measure efficiency of the system or for other reasons. In some embodiments, the use of the streamlined UI may be canceled or revoked if the high value action (or a specific intermediate action) is not preformed within the predicted amount of time or within the predicted count of intervening events.

Figure 8:
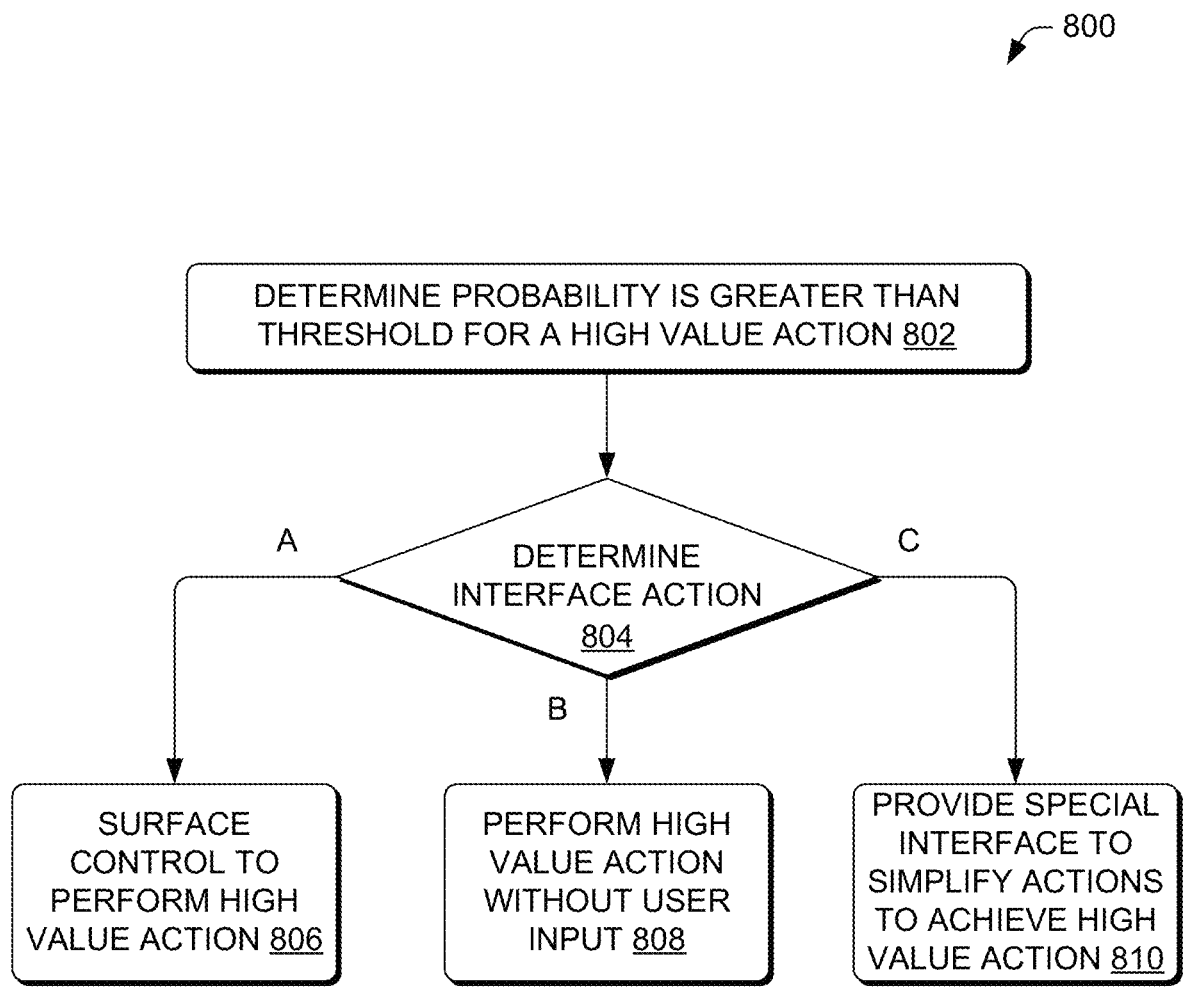
FIG. 8 is a flow diagram of an illustrative process to streamline user interfaces based on a probability of a future action being greater than a threshold.

FIG. 8 is a flow diagram of an illustrative process 800 to streamline user interfaces based on a probability of a future action being greater than a threshold. The process 800 is described with reference to the environment 100 and the computing architecture 200, and may be performed by the computing service 102.

At 802, the prediction model 214 may determine that a probability of a user performing a high value action reaches or exceeds a threshold value associated with the particular high value action. For example, the operation 802 may be the same or similar to the operation 510 or 708.

At 804, the interface module 208 may determine an interface to provide to the user device associated with the operation 802 and/or the content module 206 may determine content to provide to the user device.

Following a route "A" from the decision operation 804, the process 800 may advance to an operation 806. At 806, the interface module 208 may surface controls to facilitate or expedite performance of the high value action. The surfacing of the controls may include providing a control in a special interface that is not typically provided in a standard interface, such as a control to add an item to a virtual cart, purchase an item, submit user data, and so forth. In some embodiments, the surfacing the controls may include adding additional controls, placing the controls in different, possibly more prominent locations, and/or resizing or changing other visual attributes of the controls, such as input fields, selectable buttons, and/or other controls that enable user interaction to achieve the high value action. As an example, at 806, the interface module 208 may automatically surface or pop up a widget or other sub-interface or additional interface to complete the high value action, such as to complete a purchase, after the tipping point is detected at the operation 802.

Following a route "B" from the decision operation 804, the process 800 may advance to an operation 808. At 808, the interface module 208 or the content module 206 may perform a high value action, or a portion of the high value action, on behalf of the user or without user input. For example, the high value action may be adding an item to a virtual cart. After the probability reaches or exceeds the threshold, the interface module 208 or the content module 206 may add the item to the cart without user input typically required to add the item to the cart in typical processes. As another example, at the operation 808, the interface module 208 or the content module 206 may proactively provide a message to a user, via the user device, such as a message that most consumers completed the high value action after going through the steps prior to the conversion. An example message may state: "4 out of 5 people bought this item after clicking on the price and reviews" to a user who is browsing for information pertaining to the item.

Following a route "C" from the decision operation 804, the process 800 may advance to an operation 810. At 810, the interface module 208 may provide a streamlined or special interface to simplify actions to achieve the high value action or to facilitate or expedite performance of the high value action. For example, However, both interfaces may rely on similar underlying content. For example, the streamlined UI may be implemented by omitting or removing less relevant content, simplifying a layout, moving important controls to areas more likely to be viewed by the user, etc. By streamlining the interface, a content provider may reduce an amount of content that needs to be served to the user, via the user's device, and thus free up computing resources to perform other tasks, possibly for other users. For example, at 810, the interface module 208 may arrange the panes, panels, buttons, arrangement of various details (and also simplifying the presentation and user interface) to highlight the high value action and making it easily visible and accessible once the tipping point is achieved. For example, the moment a user, who is looking to buy a particular product, clicks on the reviews of the particular product, the interface module may highlight a particular important review and/or highlight the 'add to cart' control or make other controls more visual appealing, for example, where the highlighting may not be used in standard user interfaces (e.g., where probabilities of a high value event are less than a threshold level). As another example, at 810, the interface module 208 may sequence a set of clicks/actions that encourage the conversion of the high value action to guide the consumer towards the tipping point. The fewer the number of hits/clicks necessary for making and finalizing the decision making, the lesser is the time to complete the conversion.

In some embodiments, knowledge or discovery of the probabilities being greater than the threshold as determined at the operation 802 may be used for other reasons. For example, the computing service 102 may use this information for generating content for ad campaigns that motivate consumers towards the tipping point; for example paid search, e-mail, social, or associate ad campaigns can craft the content within (such as reviews, unique product details, pricing, promotion, discounts, competitor prices, similar products, consumer report information, in-person testing/trial at a nearby brick-n-mortar store, etc.) to help the consumer make up his or her mind.

As another example, the computing service 102 may use this information for segmenting and targeting customers based on their similar behavior that leads to the tipping point. Some customers display similar decision-making behavior and it may be helpful to understand and classify these customers based on their decision-making process. This may be a salient indicator of how consumer makes decisions, and what information they seek in order to make up their mind.

As yet another example, the computing service 102 may use this information to create or publish stories and posts in a social app, which may help users make up their mind and motivate them towards the conversion to performance of a high value action. Decision making is often a social process when it comes to certain categories, such as soft lines (apparel, accessories, and fashion), books, and electronics. There are specific cues, nudges, actions, and comments that motivate users to complete a conversion.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory comprising computer executable instructions that, when executed, cause the one or more processors to perform acts to:
determine a high value action that is a desired computing action to be predicted;
receive data that includes a sequence of user computing events associated with the high value action, the sequence of user computing events occurring prior to performance of the high value action, and the data indicating a sequential order of the sequence of user computing events, wherein at least one user computing event of the sequence of user computing events includes at least one of a transit from a first webpage to a second webpage, a user interaction with an electronic content item, or a user activation of a user interface control;
create a prediction model that associates probability values to individual user computing events of the sequence of user computing events, the probability values indicating a probability of a future performance of the high value action;
determine a current user computing event;
determine, in response to the current user computing event and using the prediction model, whether a probability value associated with the performance of the high value action is greater than a threshold value;
send a first interface to a user device in response to the current user computing event and in response to the probability value being less than the threshold value; and
send a second interface to the user device in response to the current user computing event and in response to the probability value being greater than the threshold value, the second interface including at least an interface control to achieve the high value action that is not included in the first interface or that is presented at a different location than in the first interface.

2. The system as recited in claim 1, wherein the computer executable instructions cause the one or more processors to perform acts to create the prediction model using a recurrent neural network that includes a temporal aspect in association with the future performance of the high value action.

3. The system as recited in claim 1, wherein the computer executable instructions cause the one or more processors to perform acts, in response to the probability value being greater than the threshold value, to perform a computing action, that is conventionally performed in response to a user input, prior to receiving the user input.

4. The system as recited in claim 1, wherein the computer executable instructions cause the one or more processors to perform acts to revise the prediction model in response to at least one of the current user computing event, interaction with the first interface, or interaction with the second interface.

5. A system comprising:
one or more processors; and
memory comprising computer executable instructions executable by the one or more processors to perform operations comprising:
determine a first user event of a sequence of user events during a first session with a user device;
determine a second user event of the sequence of user events during a second session with the user device, the first user event occurring prior to the second user event;
determine, in response to the first user event and the second user event, that a probability value associated with performance of a high value action during the second session is greater than a threshold value; and
select an interface from a plurality of available interfaces for data provided to the user device in response to the second user event.

6. The system as recited in claim 5, wherein the interface includes at least one of an additional control to achieve the high value action or at least one fewer control to perform operations different than the high value action as compared to other ones of the plurality of available interfaces.

7. The system as recited in claim 5, wherein the computer-executable instructions are further executable by the one or more processors to use a prediction model employing recurrent neural networks to determine the probability value.

8. The system as recited in claim 5, wherein the interface comprises at least one streamlined element to facilitate performance of the high value action.

9. The system as recited in claim 5, wherein the computer-executable instructions are further executable by the one or more processors to create or maintain a prediction model that associates the probability value to various user events, the probability value indicating a probability of a future performance of the high value action.

10. A method comprising:
determining a first user event of a sequence of user events performed during a first session with a user device, the first user event including first content provided by a first content provider;
determining a second user event of the sequence of user events performed during a second session with the user device, the second user event including second content provided by a second content provider;
determining, using a prediction model and in response to the first user event and the second user event, a probability value associated with performance of a high value action;
determining that the probability value is greater than a threshold value; and
sending, based at least in part on the probability value, a user interface of a plurality of user interfaces to the user device.

11. The method as recited in claim 10, further comprising:
determining the high value action;
receiving data that includes a plurality of user events, wherein an individual user event of the plurality of user events is associated with an individual instance of a plurality of instances of performing the high value action; and
associating, by the prediction model, an individual probability value of a plurality of probability values with the individual user event, the individual probability value indicating a probability of a future performance of the high value action.

12. The method as recited in claim 10, further comprising generating, based at least in part on a recurrent neural network and in response to at least one of a prior user event, the first user event, or the second user event, the prediction model.

13. The method as recited in claim 10, further comprising generating, based at least in part on a feedforward neural network and in response to at least one of a prior user event, the first user event, or the second user event, the prediction model.

14. The method as recited in claim 10, further comprising associating time data with a prior performance of the high value action, the time data indicating a time range of a future performance of the high value action, wherein determining the probability value is based at least in part on the time data.

15. The method as recited in claim 10, wherein the user interface includes at least one of a popup interface, a first frame included in a different user interface of the plurality of user interfaces, or a second frame.

16. The method as recited in claim 10, wherein the user interface includes an item associated with at least one of a virtual cart or a list.

17. The method as recited in claim 10, wherein the user interface is a first user interface comprising at least one first control, wherein the at least one first control is larger than a second control depicted via a second user interface of the plurality of user interfaces.

18. The method as recited in claim 10, wherein the high value action comprises at least one of purchasing an item, completing a transaction, creating an account, activating a control, receiving personal information, or receiving contact information.

19. The method as recited in claim 10, wherein at least one of the first user event or the second user event comprises activation of a control.

20. The method as recited in claim 10, wherein the first user event occurs at a first time and the second user event occurs at a second time that is subsequent to the first time.

* * * * *